Patented Aug. 16, 1949

2,479,410

UNITED STATES PATENT OFFICE 2,479,410

FATTY OIL ACID GLYCERIDE-VINYL RESIN COATING COMPOSITIONS

Henry S. Rothrock and Winston J. Wayne, Wilmington, Del., assignors to E. I. du Pont de Nemours & Company, Wilmington, Del., a corporation of Delaware No Drawing. Application August 7, 1947, Serial No. 767,338

5 Claims. (Cl. 260—23)

This invention relates to new compositions and to methods for their preparation.

Polyvinyl compounds have many properties that make them highly desirable as components of coating systems. They are deficient, however, in certain important characteristics such as flexibility, adhesion to metallic substrates, and compatability with the natural and synthetic glycerides used in the coating art and comprising the fatty oils and various synthetic mixed glycerides of fatty oil acids together with other acids. Various methods have been proposed for remedying these shortcomings. One method involves copolymerization with the natural or synthetic mixed glycerides. This is not wholly satisfactory because it is difficult to control ultimate composition and degree of polymerization. Moreover, there is a limit to the amount of vinyl resin which can thus be combined with the natural or synthetic mixed glyceride before gelation or incompatibility results. Another method is that of heat-treating the preformed polyvinyl compound with the natural or synthetic mixed glyceride containing in solution an oil-soluble varnish resin. This alternative requires careful control of the duration of the heat-treatment to avoid incompatibility. This fact makes it necessary to determine in each instance the required temperature and time conditions for compatibility. Obviously, this limits the usefulness of the process. The ideal solution to this problem is to devise vinyl resins which are inherently compatible with drying and semi-drying natural and synthetic mixed glycerides.

This invention has as an object new and useful coating compositions comprising vinyl resin and film-forming glycerides of the above-mentioned kind. A further object is a coating composition which possesses outstanding properties as protective coatings for all types of substrates and which comprises the glyceride and a type of vinyl resin which is highly compatible with the glyceride and which can be blended easily therewith in large proportions. A still further object is a method for obtaining these compositions whereby the vinyl resin is simply blended with the glyceride without the requirement of special procedure for obtaining a homogeneous product. Further objects will appear hereinafter.

We have discovered that vinyl resins which are the copolymerization product of vinyl chloride and a two-carbon fluorine-containing olefin and which contain in combined form 2% to 15% by weight of the fluorine-containing olefin and 98% to 85% by weight of vinyl chloride are compatible at ordinary temperatures with the natural and synthetic mixed glycerides. When the coating is to be applied to metallic substrates, it is desirable from the standpoint of improving adhesion to include in the polymerization mixture from 0.25 to 2% by weight of the combined vinyl chloride/two-carbon fluoroolefin of an alpha,-beta-ethylenically unsaturated dicarboxylic acid or anhydride.

In preparing the present compositions, the copolymer containing amounts of the vinyl chloride and fluoroethylene within the proportions mentioned above, and preferably from 3% to 8% of the fluoroolefin and 97% to 92% of vinyl chloride, is blended with the glyceride in the proportion from 30% to 99% by weight of the copolymer and from 70% to 1% by weight of the glyceride. The blending can be effected by mixing solutions of the polymer and the glyceride in appropriate solvents or by adding the polymer to the mixed glyceride, mechanically working the blend and adding a common solvent, or by any other means known to those skilled in the art. Varnish driers, such as cobalt linoleate, lead linoleate, iron rosinate, etc., can be added to the blend when it is desired to obtain better drying. In order to develop maximum film properties it is desirable to bake in excess of 15 minutes at 90° C. to 125° C. in an oxygen-containing atmosphere.

The solvent selected for dissolving the vinyl resin and natural or synthetic mixed glyceride should be one capable of forming a common solution of the ingredients and thus carry the respective solutes compatibly into the common mixture. Ketones, aromatic hydrocarbons, and aromatic rich hydrocarbon solvents, etc., are suitable solvents. For best results the solvent selected should be either a ketone or one containing at least 10% of a ketonic compound.

The solvent used in blending the copolymer and glyceride, with or without any further solvent added to the resulting blend is preferably such that the coating composition contains from 5% to 50% of total solids. As a rule, the concentration is adjusted to provide a material having the required viscosity characteristics for application. Thus, for roll-coating, solutions having a high viscosity are desired, whereas for spray-coating, solutions having a low viscosity are required. For brushing, the concentration is adjusted to produce a coating of the desired thickness and covering characteristics in one application.

The invention is illustrated by the following examples. Unless otherwise stated the parts are by weight.

Example I

A pressure vessel is charged with 176 parts of benzene, 25 parts of tetrafluoroethylene, 75 parts of vinyl chloride, 0.5 part of maleic anhydride, and 0.3 part of alpha,alpha prime-azobisisobutyronitrile, as polymerization catalyst. The whole is then agitated and heated at 59–65° C. for 19 hours at a pressure of 160–750 p. s. i. The pressure is maintained in this range by periodic injection of benzene. During this time a pressure drop of 2900 pounds is observed. The vessel is bled of unreacted gases, opened, and the contents discharged. There is obtained 47 parts of a polymer which contains 14.8% by weight of tetrafluoroethylene and 85.2% by weight of vinyl chloride, and has a viscosity as a 10% solution in cyclohexanone at 25° of 0.14 poise.

A 50% solution of the above copolymer is prepared by tumbling with an equal weight of cyclohexanone. This solution is then blended with a linseed oil-modified alkyd resin (containing 52% linseed oil and 48% glycerol phthalate) to give a varnish containing 65% of the oil-modified resin. Films flowed from this blend and baked at 120° C. for one hour are water-white, have excellent adhesion, flexibility and toughness. Metal panels have strong resistance to impact flexure and water penetration.

Example II

Example I is repeated using as monomer charge 15 parts of tetrafluoroethylene, 85 parts of vinyl chloride, and in one instance (a) 0.5 part of citraconic anhydride and in another instance (b) 0.05 part of sorbic acid. These experiments yield in the case of (a) 61 parts and in the case of (b) 31 parts of polymer containing approximately 9% of tetrafluoroethylene and 91% vinyl chloride.

The above polymers are compatible with up to 50% by weight of linseed oil or with large proportions of oil-modified alkyd resins. For example, blending polymer (a) with 40% of linseed oil or with 54% of a castor oil-modified alkyd resin (containing 55% of castor oil and 45% glycerol phthalate) gives a water-white varnish which has a good combination of adhesion, flexibility, and toughness. Blends of polymer (b) with linseed oil, castor oil-modified alkyd (55% castor oil and 45% glycerol phthalate), or linseed oil plus linseed oil-modified alkyd (52% linseed oil and 48% glycerol phthalate) resin give attractive finishes for metal substrates. The three-component varnish with linseed oil and linseed oil-modified alkyd is particularly attractive.

Example III

Example I is repeated using 15 parts of tetrafluoroethylene, 85 parts of vinyl chloride and in one instance (a) two parts of propionic anhydride and in another instance (b) isobutyric anhydride. Polymer (a) amounts to 29 parts and (b) to 61 parts. The polymers contain 9% tetrafluoroethylene and 91% of vinyl chloride.

Blending these polymers with linseed oil or with oil-modified alkyd resins (52% linseed oil and 48% glycerol phthalate) gives varnishes which exhibit the superior adhesion shown by the products of Examples I and II.

Example IV

A pressure vessel is charged with 88 parts of benzene, 20 parts of 1,1-difluoro-2,2-dichloroethylene, 130 parts of vinyl chloride, 0.5 part of maleic anhydride and 0.1 part of alpha,alpha prime-azobisisobutyronitrile. On agitating and heating this charge at 64–70° C. for 18 hours there is obtained 67 parts of a polymer having viscosity of 0.6 poise and containing about 15% by weight of 1,1-difluoro-2,2-dichloroethylene.

This polymer is compatible in solution and in films with up to 50% of linseed oil or with up to 50% of a drying oil (52% linseed oil and 48% glycerol phthalate) or a non-drying oil modified alkyd resin (55% castor oil and 45% glycerol phthalate). Films on metal substrates baked at 100° C. for 1 hour from a varnish comprising 40% of linseed oil, 25% of linseed oil-modified alkyd and 35% of polymer exhibit unusual adhesion, good flexibility and excellent impact resistance.

Example V

A pressure vessel is charged with 88 parts of benzene, 20 parts of vinyl fluoride, 130 parts of vinyl chloride, 0.5 part of maleic anhydride and 0.1 part of alpha,alpha prime-azobisisobutyronitrile. On heating and agitating this mixture at 65° C., there is obtained 70 parts of a polymer having a viscosity of 0.22 poise, and containing about 7% by weight of vinyl fluoride. This polymer is compatible with a variety of drying oils and alkyd resins. Films on metal substrates possessing excellent properties are obtained from a varnish containing 40% of linseed oil, 25 parts of linseed oil-modified alkyd resin (52% linseed oil and 48% glycerol phthalate) and 35 parts of the polymer. The most outstanding properties are impact and flex-resistance.

Example VI

A vinylidene fluoride/vinyl chloride polymer is prepared by heating 32 parts of tertiary butyl alcohol, 160 parts (by volume) of water, 25 parts of vinylidene fluoride, 75 parts of vinyl chloride and 0.3 part of benzoyl peroxide at 62–66° C. for 16 hours. There is thus obtained 76 parts of a polymer having a viscosity of 0.75 poise and containing about 5% by weight of vinylidene fluoride. This polymer is compatible with linseed oil in solution and in air-dried films.

Example VII

Two tetrafluoroethylene/vinyl chloride polymers are prepared by the methods outlined in the preceding examples. These polymers contain 5 and 11% of tetrafluoroethylene, respectively, and have viscosities of 0.65 and 0.85 poise. These polymers are compatible with linseed oil in solution and in air-dried films. Baked films of these polymers with linseed-oil-modified alkyd resins (52% linseed oil and 48% glycerol phthalate) are water-white and clear.

Examples of vinyl polymers other than those mentioned in the foregoing examples are the copolymers of vinyl chloride with such other haloethylenes containing at least one fluorine atom as 1,2-difluoroethylene and 1,2-dichloro-1,2-difluoroethylene. These copolymers can be obtained by the method given in Example I or by the methods described in Patent 2,419,009 and in applications Serial No. 613,212, filed August 28, 1945 now U. S. Patent 2,468,664; Serial No. 526,331, filed March 13, 1944 now abandoned; and Serial No. 524,300, filed February 28, 1944, now U. S. Patent 2,468,054.

The glycerides used in the practice of this invention are the glycerides of natural and synthetic origin which dry to solid, continuous films and which are well known in the coating art. These glycerides, for example, can consist of the natural fatty oils which are the triglycerides of fatty oil acids, or of the synthetic mixed glycerides which are the glycerides of a mixture of different fatty oil acids, or are glycerides ranging in composition from 30% to 100% fatty oil acid glyceride with any remaining glyceride being that of acid other than fatty oil acid. These latter acids, in the case of the modified oils are present in amount of at least 5% and up to 70%. A synthetic mixed glyceride of this kind is that described in Patent 2,381,880 wherein the acid other than fatty oil acid is a so-called super drying acid which confers a rapid drying rate to the resulting glyceride when present in substantial amount and preferably in amount of 5% to 60% by weight expressed as the glyceride of the super drying acid. This latter acid is a monocarboxylic acid having ethylenic double bonds in the 2 and 4 positions in which the ethylenic carbon atoms that are in direct conjugation with the carboxyl group are each attached to no more than one hydrogen atom. Suitable acids of this kind are any of those described in the above mentioned patent, and examples of these synthetic mixed glycerides useful in the present invention are the glyceride consisting of about 19% 2-methylhexadien-2,4-oic acid glyceride and 81% linseed acids glyceride, and the glyceride consisting of 17.5% hexadien-2,4-oic acid glyceride and 82.5% soyabean acids glyceride.

A further type of synthetic mixed glyceride, which is particularly suitable for the present purpose, is that in which the esterifying acid other than the fatty oil acid is a polycarboxylic acid, for example, phthalic, naphthalic, adipic, sebacic, and succinic. The most useful glycerides of this kind are those containing from 30% to 70% fatty oil acid expressed as fatty oil acid glyceride. The preparation of these glycerides, which are also known as oil modified alkyl or polyhydric alcohol-polybasic acid resins, have been described in various patents, for example, in Patents 1,541,336; 1,667,189; 1,690,515; and 1,785,930.

The most suitable fatty oils are the drying and semi-drying oils, for example, linseed oil, China wood oil, perilla oil, peanut oil, soyabean oil and the like. In the case of the synthetic mixed glycerides the fatty oil acids are preferably those derived from the above mentioned oils, although mixed glycerides of the kind previously described which have drying properties can be obtained with non-drying oils.

To the composition of this invention may be added minor amounts, up to 15%, of varnish gums and resins, such as oil-soluble 100% phenol-aldehyde resins, including the non-heat-hardening type, oil-soluble or extended phenolic resins, including heat-hardening phenolic oil-soluble varnish resins, oil-soluble natural resins and chemically or thermally modified natural resins, oil-soluble coumarone and indene resins, oil-soluble resinous reaction products of monomeric styrene, and oil-soluble hydrocarbon resins obtained from the polymerization of olefin-diolefin fractions of cracked petroleum distillates, driers, pigments, dyes, extenders, and the like.

By means of the present invention, proportions of the vinyl resin can be easily incorporated in any desired amount into the glyceride without encountering the previous difficulties in controlling ultimate composition and in avoiding gelation or incompatibility.

The compositions described herein can be applied either as solutions in organic solvent or in the form of aqueous emulsions and yield films which have a high degree of toughness and mar resistance and which have excellent adhesion to metallic substrates. For this and other purposes, these compositions can be applied readily by the usual methods of brushing, dipping, spraying, roller coating and the like.

As many apparently widely different embodiments of this invention may be made without departing from the spirit and scope thereof, it is to be understood that this invention is not limited to the specific embodiments thereof except as defined in the appended claims.

We claim:

1. A coating composition comprising a homogeneous blend of a fatty oil acid glyceride capable of drying to solid, continuous films, and a vinyl resin in the proportion of 70% to 1% by weight of said glyceride and of 30% to 99% by weight of said vinyl resin, said vinyl resin being a copolymer of vinyl chloride and haloethylene containing at least one fluorine atom, said copolymer containing by weight in combined form from 2% to 15% of said haloethylene and from 98% to 85% of vinyl chloride.

2. The coating composition defined in claim 1 in which said glyceride is a mixed glyceride of fatty oil acid and polycarboxylic acid and containing 30% to 70% of fatty oil acid expressed as fatty oil acid glyceride, and in which said copolymer contains by weight in combined form from 3% to 8% of said haloethylene and from 97% to 92% of vinyl chloride.

3. The coating composition defined in claim 2 in which said polycarboxylic acid is phthalic acid.

4. The coating composition defined in claim 1 in which said haloethylene is tetrafluoroethylene.

5. The coating composition defined in claim 1 in which said haloethylene is vinyl fluoride.

HENRY S. ROTHROCK.
WINSTON J. WAYNE.

REFERENCES CITED

The following references are of record in the file of this patent:

UNITED STATES PATENTS

| Number | Name | Date |
| --- | --- | --- |
| 1,938,662 | Lawson | Dec. 12, 1933 |
| 2,036,009 | Wright | Mar. 31, 1936 |
| 2,362,960 | Thomas | Nov. 14, 1944 |

Certificate of Correction

Patent No. 2,479,410                                                                  August 16, 1949

HENRY S. ROTHROCK ET AL.

It is hereby certified that errors appear in the printed specification of the above numbered patent requiring correction as follows:

Column 3, line 41, for "90%" read *9%*; column 6, line 34, before the word "haloethylene" insert *a*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*